United States Patent [19]
Foster et al.

[11] Patent Number: 4,925,320
[45] Date of Patent: May 15, 1990

[54] FEED BEAM ARRANGEMENT FOR A ROCKDRILL

[75] Inventors: Bruce A. G. E. Foster, Nottingham; Andrew Ollerenshaw, Yorkshire; Nigel W. Copestake, Nottingham, all of United Kingdom

[73] Assignee: Boart (UK) Limited, Littlemoor, England

[21] Appl. No.: 320,943

[22] Filed: Mar. 9, 1989

[30] Foreign Application Priority Data

Dec. 3, 1988 [GB] United Kingdom ............... 8805918

[51] Int. Cl.⁵ .............................................. F16C 29/02
[52] U.S. Cl. .......................................... 384/42; 384/41
[58] Field of Search ....................... 384/42, 41, 29, 17, 384/26

[56] References Cited

U.S. PATENT DOCUMENTS

| | | | |
|---|---|---|---|
| 1,981,992 | 11/1934 | Curtis | 384/41 |
| 2,049,394 | 7/1936 | Johnson . | |
| 2,828,109 | 3/1958 | Dellner | 255/51 |
| 3,106,117 | 10/1963 | Duquesnel | 83/32 |
| 3,650,576 | 3/1972 | Hughes | 384/41 |
| 4,114,945 | 9/1978 | Lutz | 296/137 |
| 4,253,709 | 3/1981 | Teramachi . | |
| 4,306,472 | 12/1981 | Kotte | 83/32 |
| 4,516,811 | 5/1985 | Akiyama et al. . | |
| 4,566,738 | 1/1986 | Fasth | 384/42 |
| 4,682,899 | 7/1987 | Andersson et al. | 384/41 |

*Primary Examiner*—Lenard A. Footland
*Attorney, Agent, or Firm*—Rogers, Howell & Haferkamp

[57] ABSTRACT

A feed beam for a rockdrill has slide guides along which the rockdrill can slide on the beam, with the working surfaces of the slides being removable and replaceable. The removable slide guides on the beam itself entirely determine the profile of the slide guide, and the rockdrill is supported by the detachable slide guides and by the connections between these slide guides and the feed beam. In a similar manner, the feed beam is located on a support frame of a drill boom or similar component and can be driven along the support frame by a hydraulic cylinder or other similar means.

11 Claims, 7 Drawing Sheets

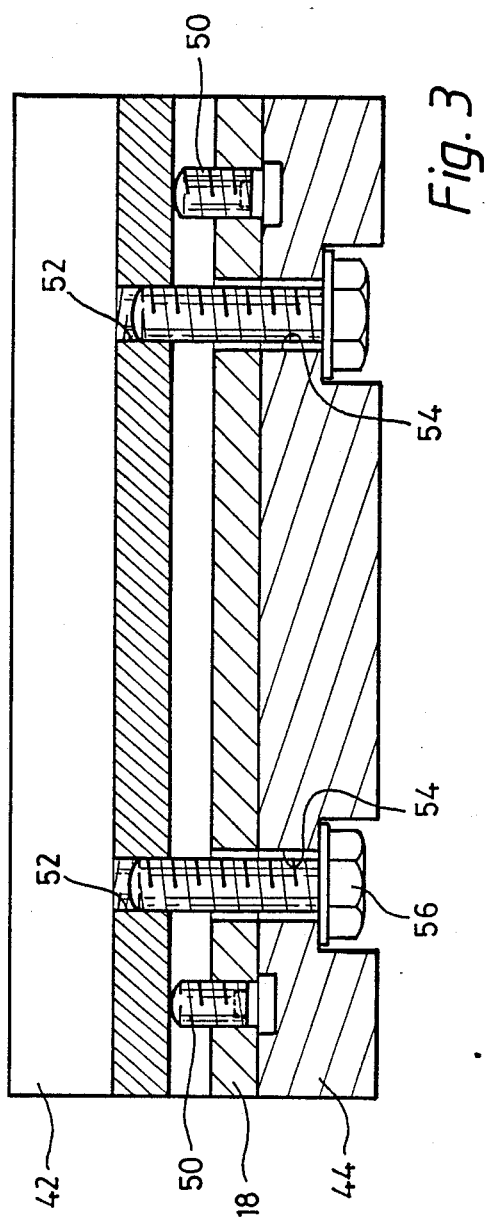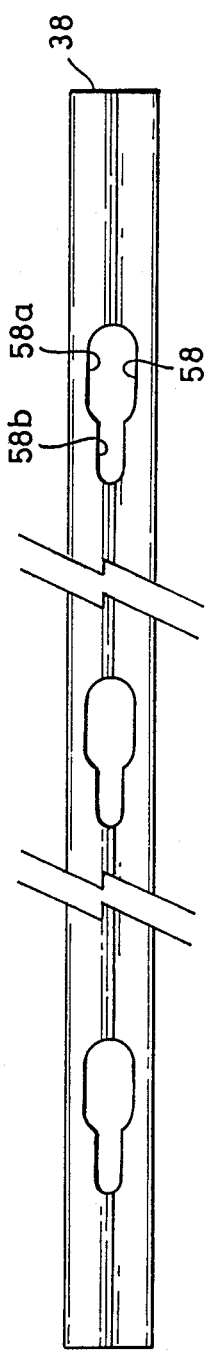

FEED BEAM ARRANGEMENT FOR A ROCKDRILL

This invention relates to a feed beam for a rockdrill in which the slide surfaces, which are wear parts, are easily removeable and replaceable.

The feed beam for a rockdrill is mounted on a slide support frame and carries a mounting plate for a rockdrill. The slide support frame is generally part of an articulated drilling boom. The beam is able to slide longitudinally relative to the slide support frame. The rockdrill mounting plate can slide on the feed bean and can move on the feed beam independently of the slide support frame.

It is desirable that the feed beam be light in weight, yet stiff in its physical characteristics. A beam of a light metal or light alloy possesses these characteristics yet is not sufficiently wear resistant to form slide surfaces for use in a mining environment.

U.S. Pat. No. 4,682,899 (Andersson et al) discloses one solution to this problem. In the Andersson patent an alloy beam is used, and plates of spring steel are clipped onto the slide support surfaces of the beam to protect these surfaces from wear. It has however been found that these plates are not sufficiently robust to always protect the light alloy from damage when a heavy impact occurs on the plate; also the spring retention system is less effective at retaining the wear plates than might be desired.

According to the invention there is provided a feed beam arrangement for a rockdrill, the arrangement comprising a beam of light metal and a carriage slideable along the beam and adapted to carry a rockdrill, wherein the beam has two opposite slide guides each in the form of an elongate member detachably mounted on the main body of the beam with the elongate member determining the profile of the slide guide and wherein the carriage has a slide seat adapted to slide on the guides and to retain the carriage on the beam.

Because the elongate members themselves determine the profile of the slide guide, if one of the elongate members is damaged, then it can be readily replaced without requiring replacement of the whole beam.

The weight of the rockdrill carriage is supported on the slide guides and is transferred to the feed beam through the mountings which secure the guides to the beam.

In a preferred embodiment, the beam has a top face which, in use, will be uppermost and the slide guides are mounted on the beam wholly below this top face. As a result of this feature, if the beam is damaged for example by a rock fall onto the top face, then the slide guides or those parts of the beam supporting the slide guides will not be damaged and it will not be necessary to replace the entire beam.

In this specification, the term "light metal" will be used, and it is to be understood that this includes both elemental metal and, preferably, alloys of light metals. A preferred aluminium alloy for the beam itself is BSS 6082.

The elongate members are wear parts and will require periodic replacement. They may for example be in the form of square section stainless steel tube or bar, but other cross-sectional shapes and other materials are possible.

The arrangement preferably also includes a second set of opposite slide guides on the beam and corresponding slide seats on a slide support frame, with the second set of slide guides also being in the form of elongate members detachable from the main body of the beam.

The use of detachable slide guides enables these wear parts to be readily replaced when they become worn. Furthermore, since the parts can be steel tubes or bars (preferably stainless steel tubes) they are readily available, relatively low cost items. The slide seats - on the carriage and on the slide support frame both incorporate slide blocks which have surfaces which slide on the slide guides. These slide blocks are preferably detachable from the carriage and may be of spheroidal graphite cast iron.

The main body of the beam is preferably a light alloy section, and the slide guides can be secured to the beam by means of bolted connections.

The connections between the slide guides and the beam take the form of bolts which extend through the thickness of the beam, and barrel nuts on the bolts, as well as longitudinally arranged keyhole-type slots in the slide guides so that a barrel nut can enter each slot through the large part thereof and when the slide guide is then moved longitudinally, the barrel becomes located behind the smaller part of the slot. The bolts are then tightened to secure the slide guides in place. To facilitate this type of fixing, (and to reduce weight and cost) the slide guides are preferably of hollow cross-section.

It is preferred for the feed beam to have longitudinally extending seats for receiving the slide guides, and for these seats to be in the form of grooves in side surfaces of the beam.

In order to achieve the desired clearance between the slide guides and the slide blocks to ensure smooth running, the slide seats preferably have tapped bores which receive grub screws, and the grub screws bear against the back surfaces of the slide blocks. The slide seats also have clearance holes for a second set of bolts which are threaded into the slide blocks. In this way, the positions of the grub screws set the positions of the blocks relative to the slide seats, and the bolts secure the blocks in position.

The slide seats of the rockdrill carriage and the slide support frame are parallel to one another. Where the slide guides are of circular cross-section, the sliding surfaces will be part-cylindrical.

The invention will now be further described, by way of example, with reference to the accompanying drawings, in which;

FIG. 3 is a section of part of the arrangement of FIG. 2, on the line III—III;

FIG. 7 illustrates a length of slide guide;

Figure 1:
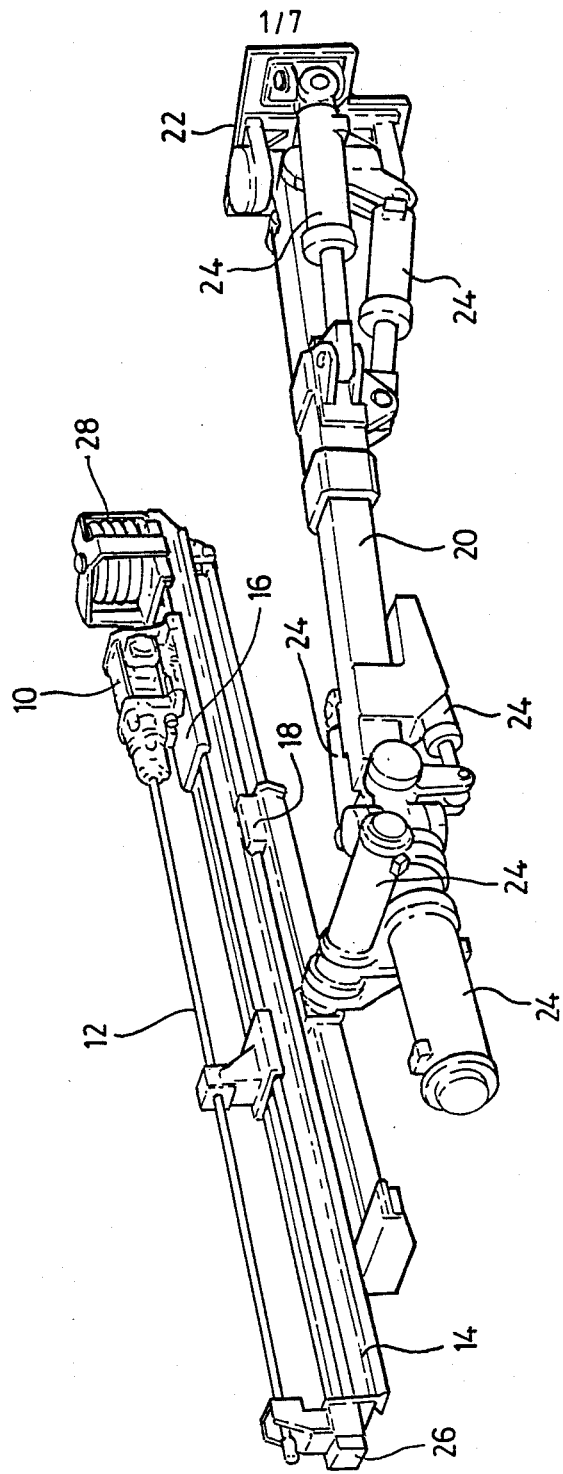
FIG. 1 is a schematic view of a rockdrill feed beam arrangement on a mounting arm.

The drill arrangement shown in FIG. 1 comprises a rockdrill 10 which rotates a drill steel 12 and is mounted on a feed beam 14 by means of a carriage 16. The drill steel carries a drill bit (not shown) at its end. The feed beam 14 is mounted on a slide support frame 19 by means of two slide seats 18, only one of which is shown, and the slide support frame is mounted on the end of a boom 20 which has a base plate 22 to be attached to a suitable fixed point which may be on a mobile chassis. The boom 20 is provided with various mechanisms (all numbered 24 here) which form no part of the present invention but which are used to position the slide support frame 18 and therefore the feed beam 14 at a desired position for drilling.

In use, once the boom has been correctly positioned, the feed beam 14 is moved along the support frame 18 until the front end of the feed beam at 26 is against the rockface. The rockdrill 10 is then operated and advanced along the feed beam so that the bit at the end of the drill steel 12 drills a desired hole in the rock.

Behind the rockdrill 10 is a reel 28 which manages the fluid hoses providing the motive power to the rockdrill.

Figure 2:
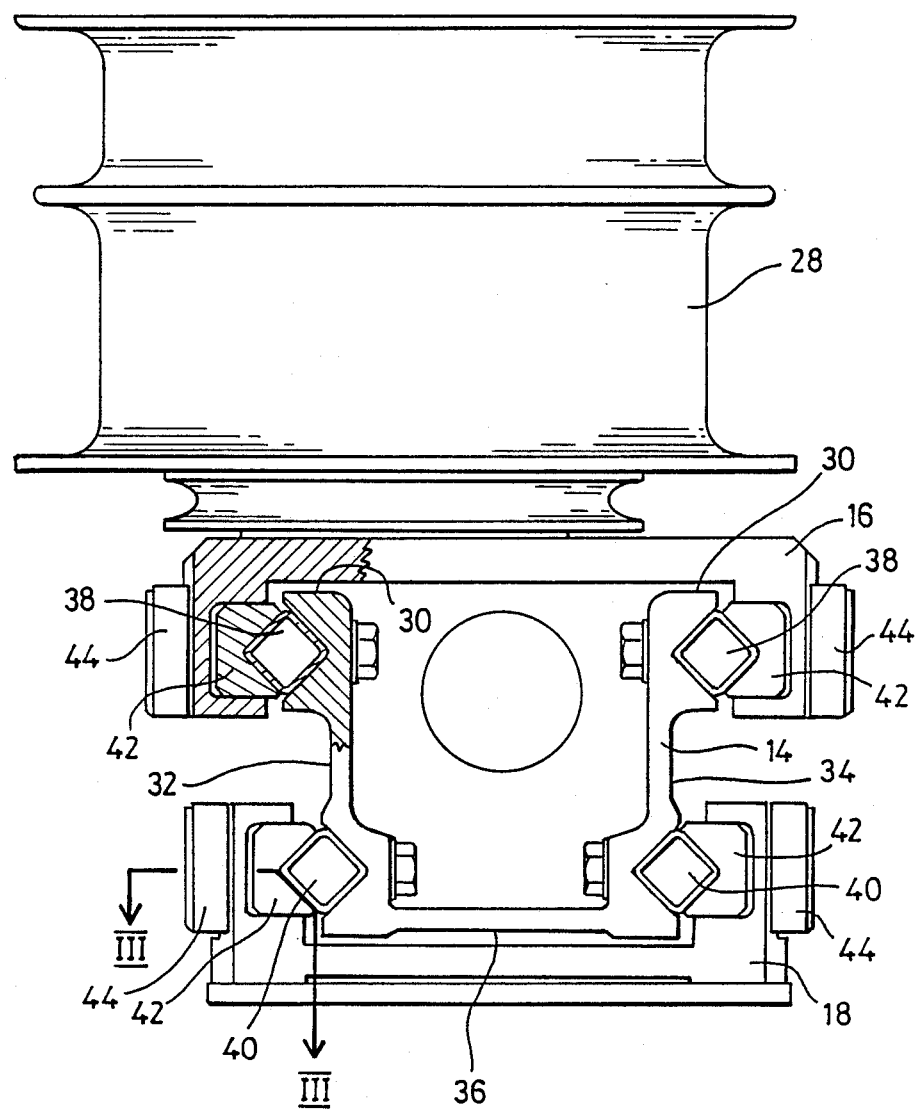
FIG. 2 is a section through a feed beam arrangement in accordance with the invention.
Figure 4:
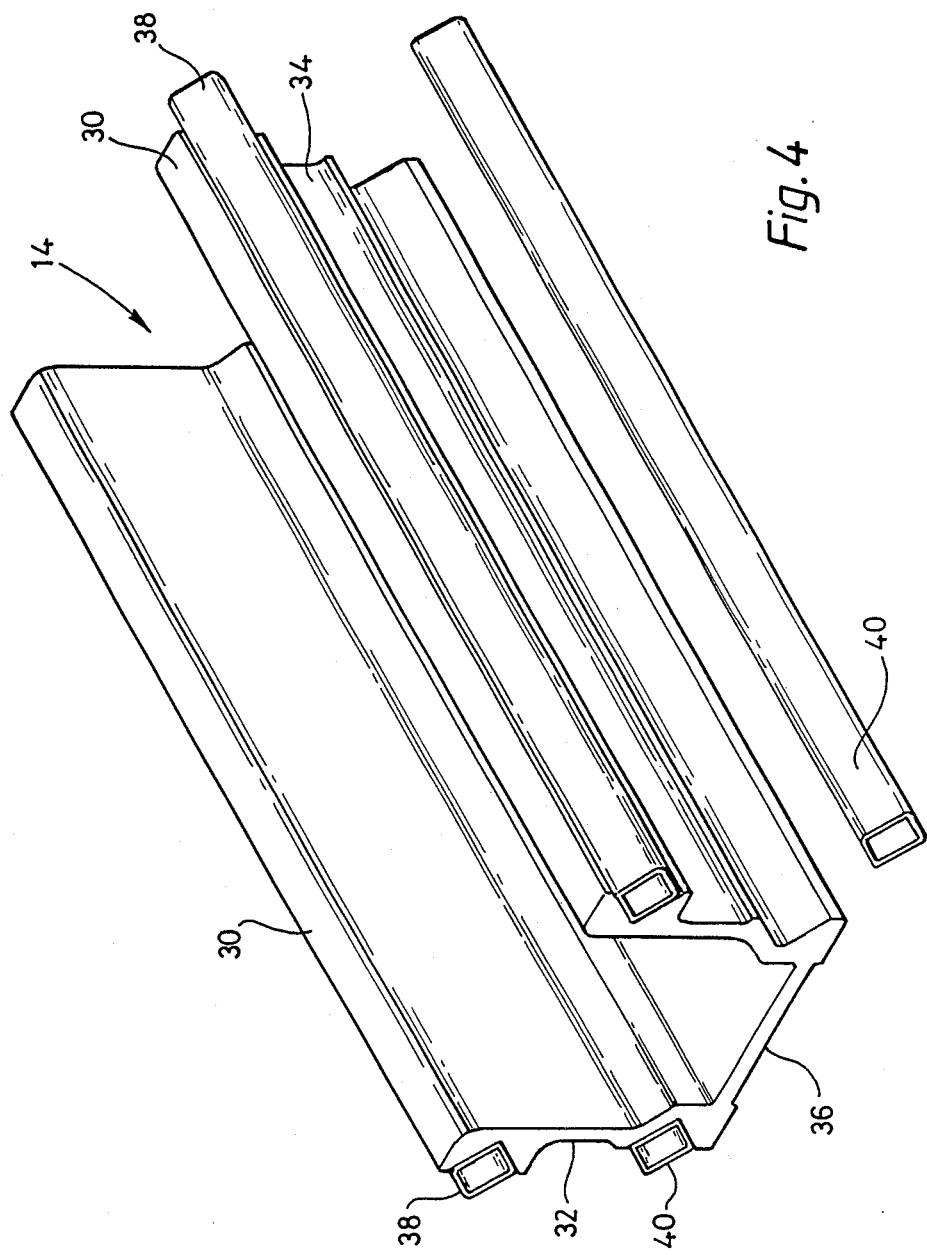
FIG. 4 is a perspective view of the feed beam extrusion together with the slide guides.

FIG. 2 shows the beam in more detail. The beam 14 itself is an extrusion of aluminium alloy and is of generally U-shaped cross-section. This can be seen also in FIG. 4. The beam has a top surface represented by two shoulders 30, two side faces 32 and 34 and a bottom face 36. Secured to the beam 14 are an upper pair of slide guides 38 and a lower pair of slide guides 40. In FIG. 4, one of the lower guides is shown detached from the beam.

Figure 8:
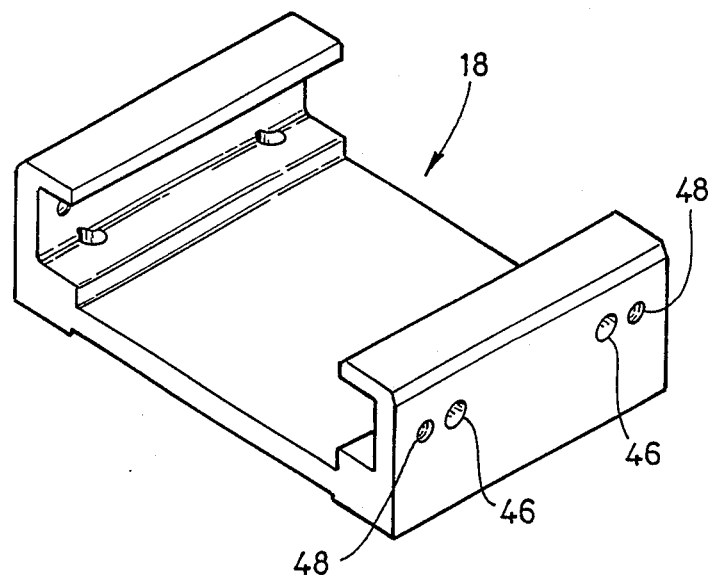
FIG. 8 is a perspective view of one slide seat from a slide support frame.

FIG. 2 shows the carriage 16 with a slide seat engaged on the slide guides 38 and the slide support frame 19 with one slide seat 18 engaged on the slide guides 40. Note that the horizontal distance between the guides 40 is less than that between the guides 38. Both the carriage 16 and the slide seat 18 have slide blocks 42 which actually make contact with the guides 38, 40 to provide the sliding surfaces. On the outside of the vertical limbs of the carriage and support frame are backing blocks 44 which are fitted here to prevent damage to the heads of bolts 56. FIGS. 3 and 8 show the manner in which the blocks 42 and 44 are connected to the slide support frame 18. A similar arrangement connects the corresponding blocks to the carriage 16.

From FIG. 8, it will be seen that the vertical walls of the slide seat 18 have two clearance holes 46 and two threaded bores 48. Grub screws 50 are screwed into the threaded bores 48 so that they project a certain distance from the inner face of the support frame 18, as shown in FIG. 3. The slide block 42 is fitted inside the vertical edges of the slide seat so that its back face is spaced from the inner face of the seat a distance determined by the projection of the grub screws.

The slide block 42 itself has a pair of internally threaded bores 52 which register with the clearance holes 46 in the seat 18 and with clearance holes 54 in the backing block 44. Bolts 56 are passed through the clearance holes 54, 46 and screwed into the tapped holes 52 so as to pull the sub assembly together. By adjusting the positions of the grub screws 50, the amount of play between the slide blocks and the slide guides can be adjusted to ensure that the carriage and the support frame slide freely and smoothly on the guides.

Figure 5:
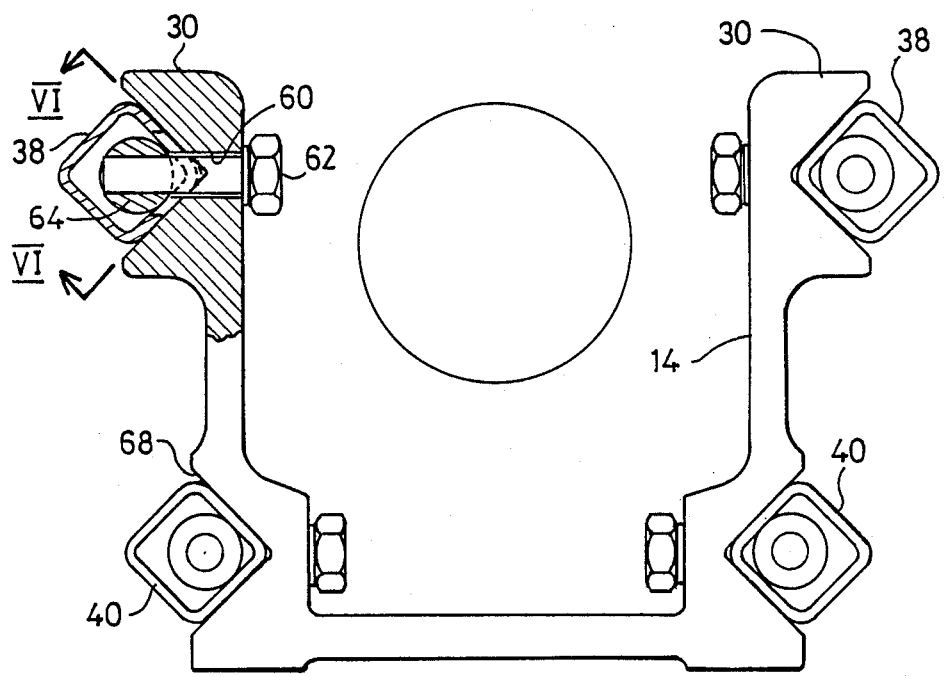
FIG. 5 is an end view of the feed beam, partly in section, showing the manner of attaching the slide guides.
Figure 6:
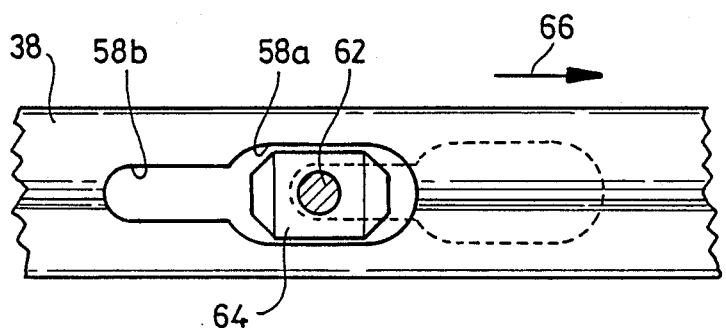
FIG. 6 is a view taken on the section line VI—VI illustrating the manner of attachment.

FIGS. 5, 6 and 7 illustrate how the slide guides 38,40 are secured on the beam 14. FIG. 7 shows a view of one slide guide 38 with a series of keyhole type slots 58. These slots can, for example, be spaced 1 meter apart over the length of the guide which may amount in total to 6 meters. Each slot has a wide part 58a and a narrow part 58b. In the beam 14, there are clearance bores 60 and bolts 62 pass through these bores and are each threaded into a barrel nut 64. This barrel nut is shaped so that it will pass through the wide part 58a of the slot, but not through the narrow part 58b.

In order to mount a slide guide on the beam, the bolts 62 and their nuts 64 are put in place but are not tightened. The slide guide 38 is then offered up to the beam so that all of the barrel nuts 64 pass through the wide parts 58a of each slot 58. The slide guide 38 is then moved longitudinally a illustrated by arrow 66 in FIG. 6 until the shank of the bolt 62 comes to lie in the narrow part 58b. In this position, the bolts 62 are tightened. Because of the barrel shape of the nuts 64, they do not rotate but instead they clamp the guides to the beam. Removal of the slide guides is a reverse of this procedure by slackening the bolts, then sliding the guides until they can be lifted off the nuts which remain in place on the beam.

It will be noted that the slide guides seat in a V-shaped groove 68 on the beam. Because the surface of the groove 68 is below the side surface of the beam, any impacts which may occur on the beam are unlikely to damage the operative surfaces of the seats, so a damaged slide guide can be replaced and the seat 68 will be undamaged and able to accept a new, undamaged guide. Similarly, the top surfaces 30 which are most likely to be damaged if there is a fall of rock where the beam is operating, play no part at all in providing seats for the slide guides and damage to these parts will not alter the usefulness of the feed beam.

Figure 9:
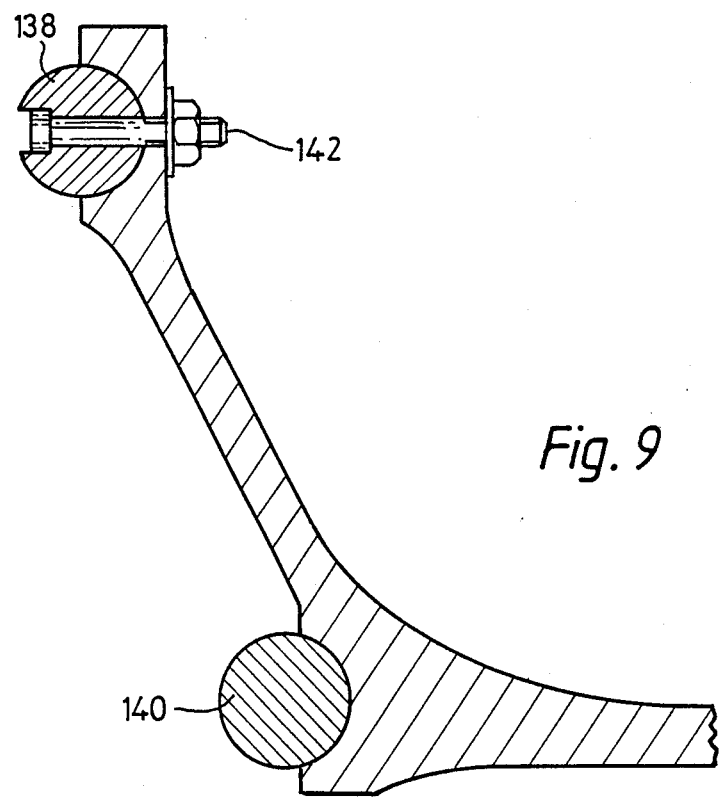
FIG. 9 is a cross-sectional view through part of an alternative form of feed beam in accordance with the invention.
Figure 10:
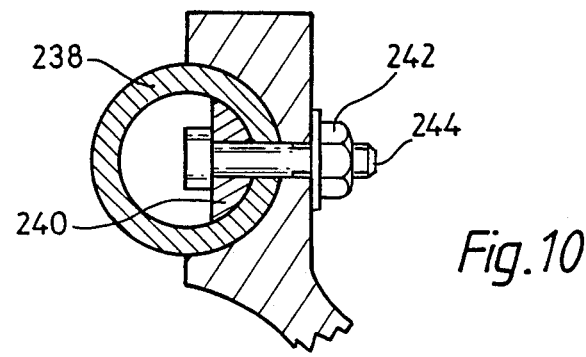
FIG. 10 shows a detail of an alternative fixing method for a slide guide.

The same features are present in the embodiments of FIGS. 9 and 10 where circular section slide guides 138,140 are used. In FIG. 9, the slide guides are solid and the mounting bolt 142 extends right through a bore on the diameter of the guide. In FIG. 10, a tubular slide guide 238 is fastened in a manner similar to that shown in FIGS. 5 and 6, in that keyhole type slots are used to allow a bolt supporting member 240 to enter the internal cavity of the guide before the guide is moved longitudinally to trap the member 240 so that the nut 242 on the bolt 244 can be tightened.

The feed beam 14 itself is extruded from aluminium alloy BSS 6082, but other alloys or other materials may be used with the same or a different cross-section, provided that the beam acquires a similar rigidity and stiffness. It is important that the beam cross-section should result in similar moments of inertia, in planes at right angles to one another as the beam may operate either upright, or rotated through 90° about its own axis.

It has been found that spheroidal graphite cast iron is a suitable material for the slide blocks 42 and that stainless steel is suitable for the slide guides 38,40. The marrying up of these materials (SG cast iron and stainless steel) at the slide surfaces produces good resistance to wear and good sliding contact.

FIG. 8 shows some detail of the slide seat 18. The carriage 16 which engages on the top slides of the beam will be of generally similar construction, with facility on the top face for mounting the rockdrill 10 and the reel 28.

The construction of the slide guides as shown and the positive mounting on the feed beam ensures firstly that the slide guides are themselves protected from damage, secondly that they are securely fastened yet easily replaceable and thirdly that any minor damage to the beam will not affect the future functioning of the beam because of the location of the slide guides relative to the corners and faces of the beam.

We claim:

1. A feed beam arrangement for a rock drill, the arrangement comprising a beam of light metal and a carriage slideable along the beam and adapted to carry a rock drill, wherein the beam has two opposite slide guides each in the from of an elongate member detachably mounted externally on the main body of the beam with the elongate member determining the profile of the slide guide and wherein the carriage has a corresponding slide seat adapted to slide on the guides and to retain the carriage on the beam.

2. A feed beam arrangement as claimed in claim 1, wherein the beam has a top face which, in use, will be uppermost and the slide guides are mounted on the beam wholly below this top face.

3. A feed beam arrangement as claimed in claim 1 or claim 2, wherein the slide guides are mounted in seats on the feed beam itself, the seats being in the form of grooves which are recessed relative to the side surfaces of the beam.

4. A feed beam arrangement as claimed in claim 1, wherein the beam is an aluminium alloy extrusion.

5. A feed beam arrangement as claimed in claim 1, wherein the slide guides are square section stainless steel tube.

6. A feed beam arrangement as claimed in claim 1, wherein the slide seat is detachably mounted on the carriage.

7. A feed beam arrangement as claimed in claim 1, including a second set of opposite slide guides on the beam and corresponding slide seats on a slide support frame, with the second set of slide guides also being in the form of elongate members detachable from the main body of the beam.

8. A feed beam arrangement as claimed in claim 1, wherein the slide guides are secured to the beam by means of bolted connections.

9. A feed beam arrangement as claimed in claim 8, wherein the bolted connections are provided by bolts with barrel nuts, and the slide guides have keyhole-type slots extending longitudinally so that a barrel nut can enter each slot through the large part thereof and, when the slide guide is then moved longitudinally, the barrel becomes located behind the smaller part of the slot.

10. A feed beam arrangement as claimed in claim 1, wherein the slide seats on the slide support frame and/or on the carriage include slide blocks of spheroidal graphite cast iron.

11. A feed beam arrangement as claimed in claim 10, wherein the slide blocks are adjustable relative to the slide guides to set the amount of play between the blocks and the guides.

* * * * *